UNITED STATES PATENT OFFICE.

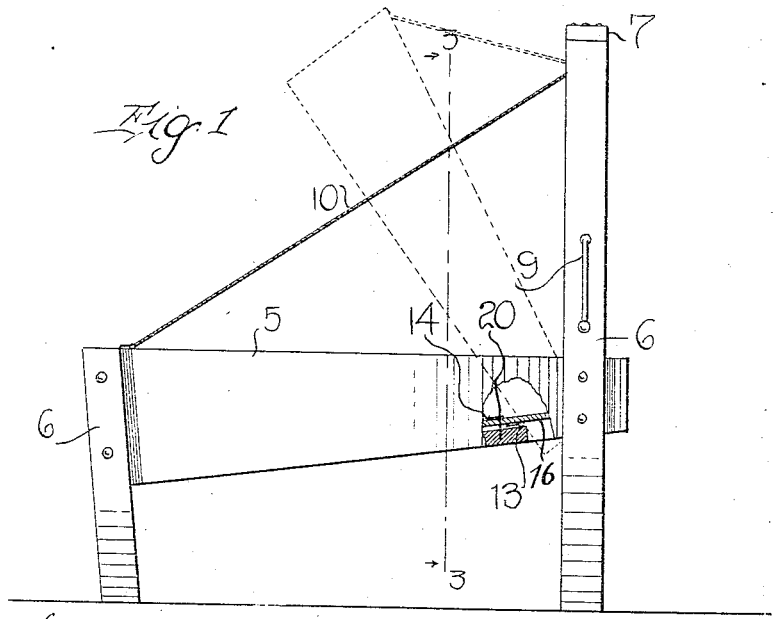
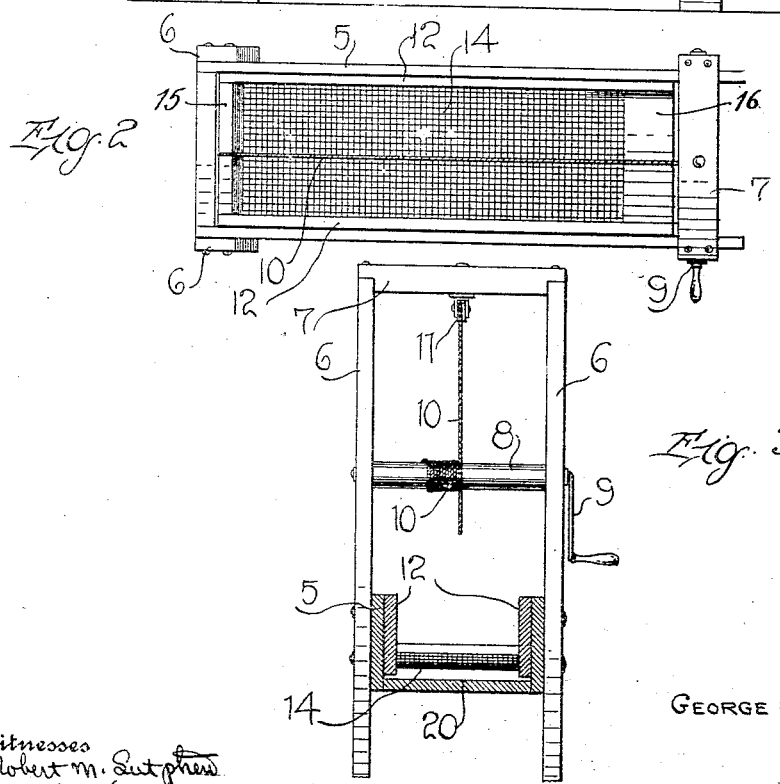

GEORGE McCABE, OF POCATELLO, IDAHO.

GRAIN-CLEANING MACHINE.

1,145,154.  Specification of Letters Patent.  Patented July 6, 1915.

Application filed February 26, 1914. Serial No. 821,305.

*To all whom it may concern:*

Be it known that I, GEORGE McCABE, a citizen of the United States, residing at Pocatello, in the county of Bannock and State of Idaho, have invented certain new and useful Improvements in Grain-Cleaning Machines, of which the following is a specification, reference being had to the accompanying drawings.

This invention relates to a machine for disinfecting seed and has for its primary object to provide improved means for quickly and thoroughly treating large quantities of potatoes, grain or seed to be used for planting purposes whereby smut and other disease germs may be removed therefrom.

The invention has for a further object to provide a machine for the above purpose embodying means whereby the seed may be readily discharged or dumped into a suitable receiving receptacle after they have been treated.

The invention also has for a further object to provide a seed or grain treating machine which consists of very few parts of simple construction and which may therefore be produced and sold at small cost.

With the above and other objects in view as will become apparent as the description proceeds, the invention consists in certain constructions, combinations, and arrangements of parts that I shall fully hereinafter set forth and claim.

For a full understanding of the invention, reference is to be had to the accompanying drawings, in which—

Figure 1 is a side elevation of a machine embodying my invention in its preferred form. Fig. 2 is a top plan view. Fig. 3 is section taken on the line 3—3 of Fig. 1.

Referring in detail to the drawing, 5 designates a box or receptacle designed to receive the potatoes or grain or other product to be treated, said receptacle being mounted at its ends upon the front and rear uprights or supports 6 and 7, respectively. It will be observed that this box or receptacle tapers longitudinally or gradually increased in depth from its rear to its forward end.

The rear uprights 6 are of considerably greater height than the forward uprights and are connected at their upper ends by the transverse bar 7. Between the uprights 6 a drum 8 is rotatably mounted, a suitable crank indicated at 9 being connected to one end of the drum shaft. One end of a rope or cable 10 is secured to this drum, said cable passing around a guide sheave or pulley 11 mounted upon the transverse bar 7 and having its other end attached to the forward closed end wall 15 of a discharge chute. This chute consists of side walls 12, the end wall 15 and a platform 16, the forward end of the chute being open, and the bottom 14 of the chute being constructed from a sheet of reticulated material suitably secured to the walls and platform. The chute fits loosely within the receptacle 5, and is mounted therein for swinging movement by means of a hinge 13 secured to the under side of the platform 16 and to the upper side of the bottom 20 of the receptacle, the bottom terminating short of the rear wall of the receptacle in order to provide a space to receive the rear end of the chute when the latter is swung or tilted to the position indicated by dotted lines in Fig. 1.

In the use of my improved grain treating machine, a solution of blue vitriol or formaldehyde and water is prepared and supplied to the box or receptacle 5. The discharge chute being in its lowered position within said receptacle, the potatoes or grain are placed within the same. The heavy particles of grain or potatoes which are in good condition will immediately sink to the bottom of the chute while the lighter bad particles together with smut or other disease germs will float upon the surface of the solution. This foreign matter may be skimmed off by means of a suitable implement provided for the purpose. After the potatoes or grain to be treated have remained in the solution for the required length of time, the operator winds the rope 10 upon the drum 8, and as this cable is connected to the forward end of the chute the chute will be lifted to the inclined position shown in dotted lines in Fig. 1. As this chute is provided with a perforated bottom, the water will of course readily pass through the same while the grain will be carried upwardly with said member until it gravitates downwardly upon the bottom thereof and is discharged from its rear open end into a sack or other suitable receptacle arranged beneath the same.

From the foregoing description it will be seen that a large quantity of grain may be quickly and thoroughly disinfected so that disease germs will be removed therefrom and the best crop results thus secured. It is of course obvious that the machine may be made of any desired capacity, though I have found that the treatment of one hundred pounds of grain at each operation is productive of the best results. It will be appreciated that owing to the extremely simple construction of the machine, the same may be produced and sold at very small cost. The device is also highly reliable and efficient in practical operation.

While I have shown and described the preferred embodiment of my invention, it is to be understood that the invention is susceptible of considerable modification therein, and I therefore reserve the privilege of resorting to all such legitimate changes as may be fairly embodied within the spirit and scope of the appended claim.

What is claimed is:

The herein described grain cleaning machine comprising in combination, the following elements to wit; a stationary receptacle having an inclined bottom wall, said receptacle being closed at one end and open at its opposite end, said bottom wall at the latter end of the receptacle terminating short of the side walls thereof, a discharge chute including spaced parallel side walls, an end wall connecting the side walls at one of their ends, a transverse base member connecting said side walls at their opposite ends, said base member being hingedly mounted upon the bottom wall of the receptacle at the open end thereof, and a reticulated fabric connected to the side walls of said chute and constituting the remaining bottom portion thereof, the side walls of said chute being pivotally mounted upon the side walls of the receptacle at the open end of the latter and fitting snugly between the same, and means connected to the end wall of the chute to elevate the same and discharge the contents of said chute from the open end of the receptacle.

In testimony whereof I hereunto affix my signature in the presence of two witnesses.

GEORGE McCABE.

Witnesses:
L. C. BABCOCK,
W. E. WALDRON.